United States Patent [19]

Kuss

[11] 4,317,589
[45] Mar. 2, 1982

[54] AUXILIARY SUN VISORS

[76] Inventor: John D. Kuss, 4092 Darrow Rd., Stow, Ohio 44224

[21] Appl. No.: 134,211

[22] Filed: Mar. 26, 1980

[51] Int. Cl.³ .............................................. B60J 3/00
[52] U.S. Cl. ............................... 296/97 D; 296/97 F
[58] Field of Search ................ 296/97 C, 97 D, 97 F, 296/97 R

[56] References Cited

U.S. PATENT DOCUMENTS

| | | | |
|---|---|---|---|
| 1,470,553 | 10/1923 | Church | 296/97 C |
| 2,603,530 | 7/1952 | Jones | 296/97 D |
| 2,894,576 | 7/1959 | Williams | 296/97 C |
| 3,208,792 | 9/1965 | Martin | 296/97 C |
| 3,369,837 | 2/1968 | Metier | 296/97 C |

FOREIGN PATENT DOCUMENTS

| | | | |
|---|---|---|---|
| 248893 | 8/1966 | Austria | 296/97 C |
| 1449358 | 7/1966 | France | 296/97 C |

Primary Examiner—Joseph F. Peters, Jr.
Assistant Examiner—Ross Weaver
Attorney, Agent, or Firm—R. P. Yaist; L. A. Germain

[57] ABSTRACT

An auxiliary sun visor that attaches to a vehicle's standard visor comprises a magnetizable plate affixed to the standard visor, a plastic transparent filter, and a single magnet having means for attachment of the filter. The auxiliary transparent filter is readily attached to the plate via magnetic attraction of the magnet and is movable for multi-angular positioning within the viewing area of the vehicle windshield.

8 Claims, 13 Drawing Figures

AUXILIARY SUN VISORS

BACKGROUND OF THE INVENTION

This invention generally relates to vehicle sun visors and more particularly to an improved auxiliary visor that is a functioning transparent sun and/or glare filter and may be positioned in a multiplicity of desired angles in a simple, quick, and expeditious manner.

Present sun visors which are standard equipment in vehicles are conventionally opaque structures that cover a limited area of the windshield. These visors are intended to completely block out harmful sun and/or glare rays which momentarily blind the operator and are considered more aesthetic than functional, being made of materials according to the vehicle interior decor. Therefore, and because of their limited functionality, various attempts have been made to supplement the standard visor concept by the addition of transparent light filtering materials.

Vehicle manufacturer's have attempted to remedy this visor deficiency by offering optional tinted windshields that in some instances have an area of increased and/or enhanced tinting along the top border of the windshield. While this limits the intensity of light passing through that portion of the windshield, it is firstly of little value to the vehicle buyer who doesn't take the optional tinted windshield and secondly it covers only a specific portion at the top of the windshield, which portion is already covered by the provision of the standard equipment visor.

Other attempts to remedy this visor deficiency have taken the direction of providing auxiliary visor devices that may be affixed to the standard equipment visor so as to cover the area of the windshield below and around the periphery of such standard visors. These attempted remedies are shown and described in the prior patent art as exemplified in the following U.S. Pat. Nos. 2,603,530; 3,208,792; 3,679,255; 3,853,370; 3,948,554 and 4,090,732. While these prior art devices provide the sun and/or glare protection desired, they are mechanically complicated and require a multiplicity of individual parts. They are therefore expensive to manufacture and the specially designed and configured parts make it difficult to replace and/or maintain the device for an increased useful life.

In contrast to these prior art remedies therefore, the present invention intends to provide an auxiliary sun and/or glare filtering device that: is extremely simple by design, requires a minimum of functional parts, is easily maintained and/or replaced, and exhibits low cost in the marketplace.

SUMMARY OF THE INVENTION

The beforementioned advantages of the invention will become apparent from the description that follows which describes the details of an auxiliary sun visor for attachment to a standard equipment sun visor comprising a magnetizable plate affixed to the standard visor, a plastic transparent filter, and a single magnet having means mounted thereon for attachment of the filter, said magnet and filter being attached by magnetic attraction to the plate and movable for multi-angular positioning within the viewing area of the windshield and of being stowed and hidden behind the standard visor when such standard visor is in a raised position.

BRIEF DESCRIPTION OF THE DRAWINGS

The invention will be better understood from the following detailed description when considered in conjunction with the accompanying drawings in the several figures of which like reference numerals identify like elements and in which.

DETAILED DESCRIPTION OF THE INVENTION

Figure 1:
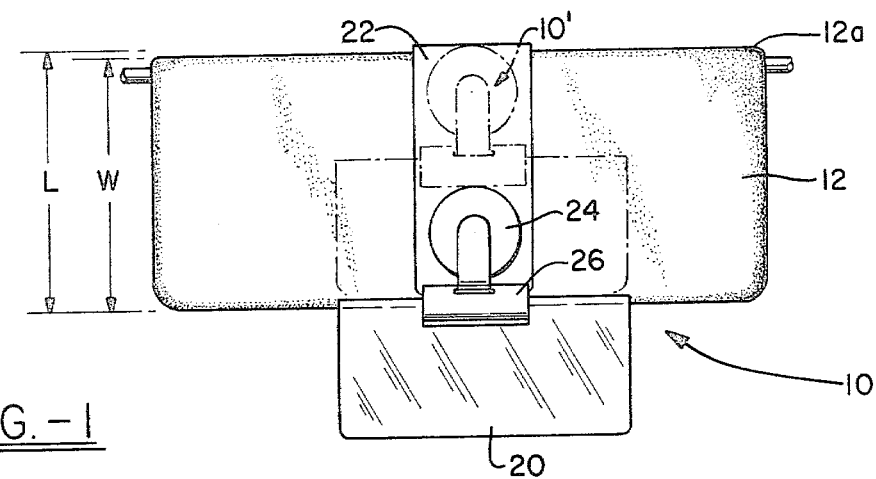
FIG. 1 illustrates the application of the invention to a standard equipment vehicle sun visor.
Figure 2:
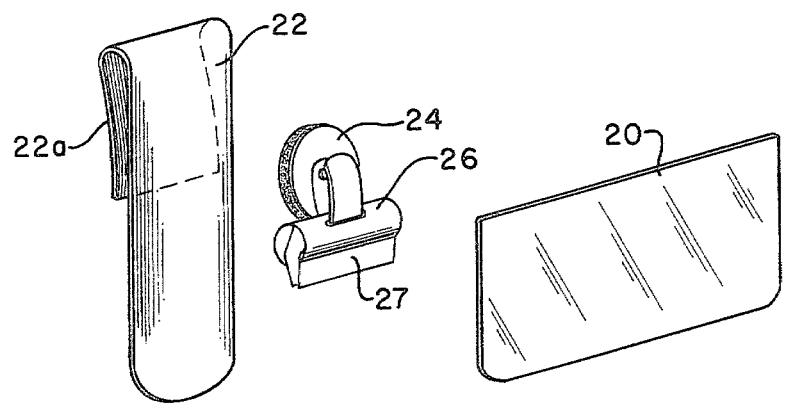
FIG. 2 is a perspective assembly view illustrating the elements comprising the invention.

Referring to FIGS. 1 and 2, an auxiliary sun visor is generally indicated by reference numeral 10 as it may be mounted to a standard equipment vehicle visor 12. The auxiliary visor 10 essentially comprises a plastic sun and/or glare filtering element 20, a metallic plate 22 mounted on the standard visor 12, and a single magnet 24 having means 26 thereon for attachment to the filter element 20. The magnet 24 may thus be readily attached by magnetic attraction to the plate 22 and allows for positioning of the element 20 for filtering out objectionable light rays passing around the periphery of the standard visor 12.

Figure 11:
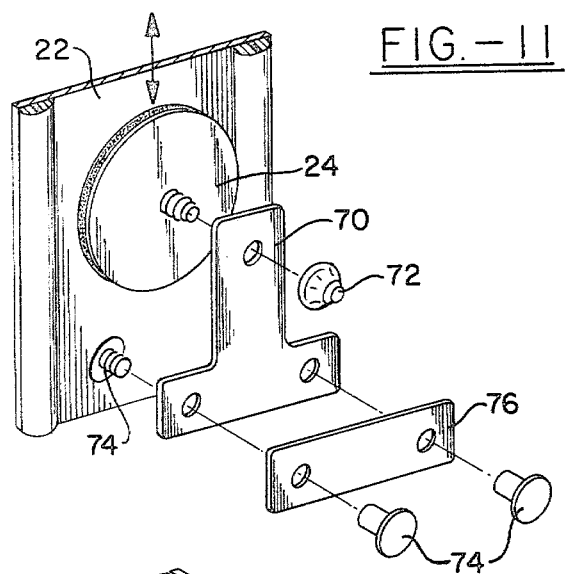
FIG. 11 is a partial perspective view showing an assembly of the magnet and filter elements and illustrating an alternative attachment means therebetween.
Figure 12:
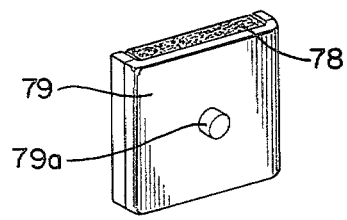
FIG. 12 is a perspective view of an alternative magnet configuration.

As illustrated in FIG. 2, the magnet 24 in its simplist form is a disc magnet adhesively secured to a metal backing disc or it may be mounted in a cup-shaped housing. Further, the means 26 for attachment of the filtering element 20 comprises a standard bull-clip 27. In this configuration, the filtering element 20 in its simplist form may be a substantially rectangular shaped piece of plastic exhibiting light filtering qualities and no requirement is made therefore for any special type fasteners inasmuch as the bull clip has sufficient spring strength to hold the filter 20 rigidly when the magnet 24 is attached to the metal plate 22. It will of course be recognized that the magnet 24 and attached bull clip 27 are well known office supplies and are readily available in the marketplace. It is anticipated that other magnetic configurations and/or filter attaching means may be used to advantage and one of these is illustrated in FIGS. 11 and 12 and will be specifically described hereinafter.

Further with respect to FIG. 2, the metallic plate 22 in its simplist form is a flat metal piece having substantial width and bent in a hook configuration 22a to conform to the top edge 12a of the standard visor 12. The gauge of the metal is preferably within the range of 0.024–0.032 inches and is therefore readily and easily bent by hand to a closed position to accept various thicknesses of visor 12. When the flat metal is bent to a hook or clip configuration, its working length L is approximately equal to the width W of the standard visor such that it does not extend below the visor 12 and obscure the vision area of the windshield.

Figures 3, 4, 5:
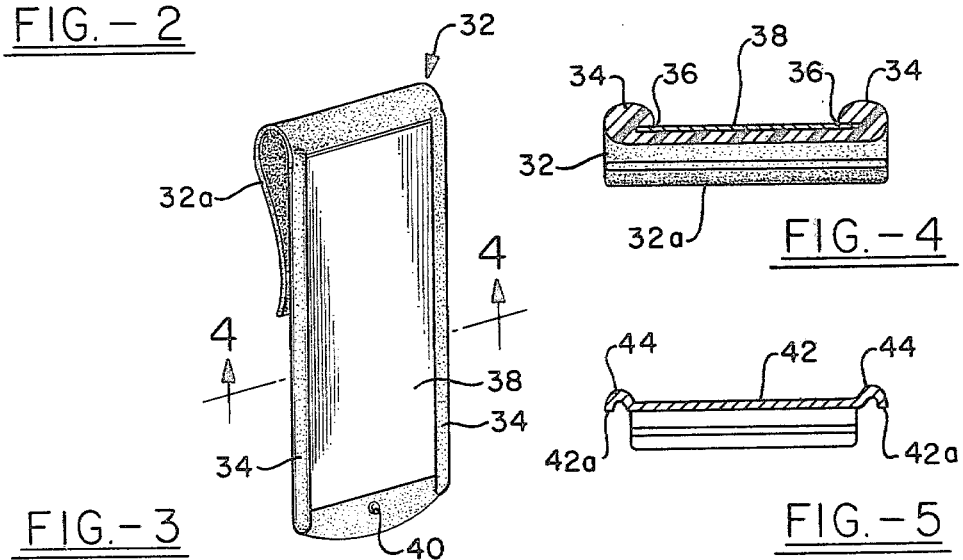
FIG. 3 is a perspective view of a combination plastic/metal clip forming a second embodiment of that one element.
FIG. 4 is a sectional elevational view of the clip shown in FIG. 3 as taken on line 4—4 thereof.
FIG. 5 is a sectional elevational view similar to FIG. 4 of an all-metal clip forming another embodiment thereof.
Figure 6:
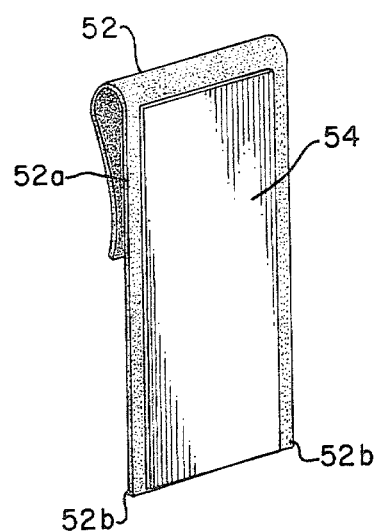
FIG. 6 is a perspective view similar to FIG. 3 of a plastic/metal clip forming another embodiment thereof.
Figure 7:
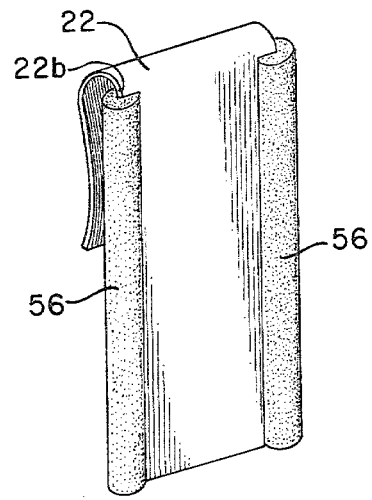
FIG. 7 is a perspective view similar to FIG. 6 illustrating a metal clip having mounted plastic side rails thereon.

While the clip 22 is sufficient for its intended purpose, FIGS. 3 thru 9 illustrate alternative embodiments that exhibit certain advantages thereover. Referring firstly to FIG. 7, a clip 22 is shown with a pair of rail members 56 that are merely plastic tubes having lengthwise slits such that they may be mounted along the lateral edges 22b of the clip 22. The rails 56 may be adhesively secured to the clip and serve as guides for the magnet 24 when it is mounted thereon. In this manner the vehicle operator may move the filter element 20 to a desired position without having the magnet 24 inadvertently slide off of either side of the metal clip 22. FIG. 6 illustrates an alternative clip 52 that is made of plastic material formed into a hook end 52a. Plastics of the type that will exhibit a closure force such as to be capable of being clamped to various thicknesses of visor 12 are well known in the art. Further, the plastic may be made in any color to match the decor of the particular vehicle in which it will be used. The plastic clip 52 carries a metal plate 54 that is adhesively mounted on the flat extension of the clip such that the filter element 20 may be mounted thereon via the magnet 24. Of course, it is anticipated that similar rail members 56 may be mounted on the lateral edges 52b of the plastic clip 52 to limit the movement of the magnet 24 thereon to a lengthwise excursion along the clip. FIGS. 3 and 4 illustrate a plastic clip 32 that has a hook type end 32a for attachment to the standard visor 12 and in this embodiment a pair of rail members 34 are molded as part of the clip. The rail members 34 have slots 36 along the inside edge thereof such that a rectangular metal plate 38 may be secured to the clip 32 via insertion into the slots. To insure that the metal plate 38 does not move off of the clip by motion of the magnet 24, a plastic mode 40 is formed at the bottom end thereof. FIG. 5 illustrates a further alternative for the clip 22 and in this embodiment an initially flat metal stock 42 is bent to a hook shape at one end and has side rails 44 integrally formed along the lateral edges 42a thereof. It will be appreciated that the rails 44 are formed in a configuration such that the edges 42a face against the standard visor surface to which it is mounted.

Figure 8:
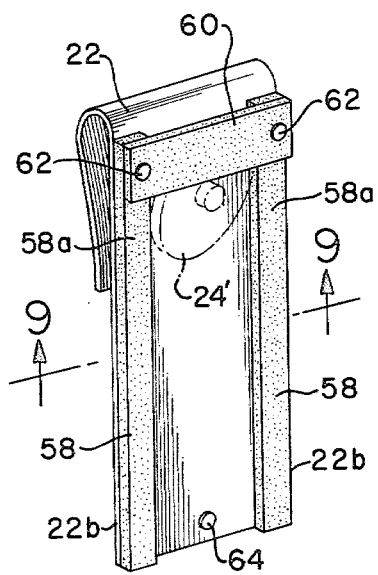
FIG. 8 is a perspective view of a clip similar to FIG. 7 but having magnet stopping means mounted thereon.
Figure 9:
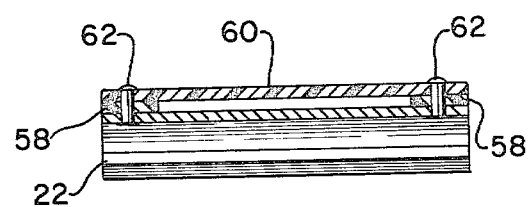
FIG. 9 is a sectional elevational view of the clip shown in FIG. 8 as taken on line 9—9 thereof.

FIGS. 8 and 9 illustrate a further embodiment of the clip 22 wherein a pair of plastic side rails 58 are mounted on one side and along the lateral edges 22b thereof. The rails 58 have a width of approximately $\frac{1}{4}-\frac{3}{8}$ inch and are formed with substantially flat surfaces 58a. In this embodiment a member 60 is fastened across the top edge of the rails via rivets 62 that also serve to secure the rails 58 to the clip 22. The cross member 60 is intended to provide a stop for the magnet 24 when it is slid to the top position of the clip as illustrated by the ghost line showing 24' and its raised position also illustrated in FIG. 1 by reference numeral 10'. An additional rivet 64 may be provided at the bottom of the clip 22 to further limit the extent that the magnet may be moved in that direction. It will be appreciated that the cross member 60 provides a convenient finger-hold for maintaining the clip stationary on the visor 12 when positioning the filter 20 via the magnet 24. For example, the operators fingers are positioned on the cross member 60 while the thumb is used to move the magnet 24 to the desired position on the metal clip 22. Thus, the vehicle operator may position the filter element 20 via a single hand operation without taking his other hand off the steering wheel or his eyes off of the road ahead.

Figure 10:
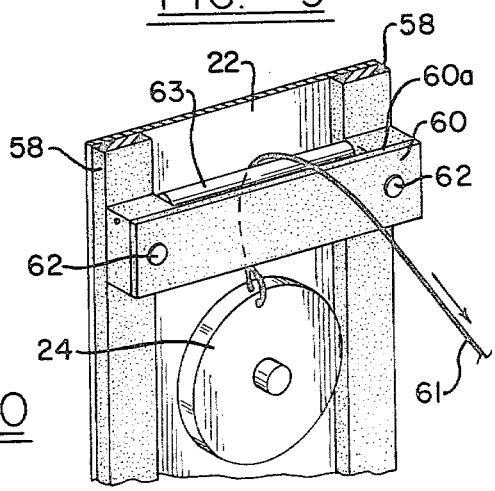
FIG. 10 is a partial perspective view of the clip shown in FIG. 8 illustrating means for moving the filter to a stowed position.

FIG. 10 illustrates an additional convenience that may be added to the embodiment shown in FIG. 8. Accordingly, and to facilitate moving of the magnet 24 and thus the filter 20 to its stowed position at the top of the clip 22, a cord 61 may be attached to the magnet 24 and passed around the cross member 60 such that when the cord 61 is pulled the magnet/filter move upwardly between the rails 58 until the magnet abuts the cross member 60. In this respect the cross member 60 may be provided with a smooth and friction-free edge 60a or be provided with a small roller 63 for passage of the cord 61 therearound.

FIG. 11 illustrates an alternative mounting for the filter 20 to the magnet 24. In this embodiment a T-shaped member 70 of flat plastic or metal stock is provided that is secured to the magnet via a locking cap 72 and to the filter element 20 via snap rivets 74. A top strip 76 may also be provided such that the filter material is sandwiched therebetween to thus strengthen the assembly. Further, all of the elements comprising the auxiliary visor assembly may be packaged in disassembled form and are of such elementary design so as to be readily assembled for use by anyone.

FIG. 12 illustrates an alternative embodiment for the magnet 24. In this embodiment the magnet 78 takes a substantially square shape that conveniently maintains a specific orientation when mounted on the previously described clips having side rails thereon.

Magnets 78 of the type described are readily available in the marketplace and usually include a metal housing 79 having a rivet or like fastener 79a affixed thereto for attachment of bull clips 27 and the like.

Figure 13:
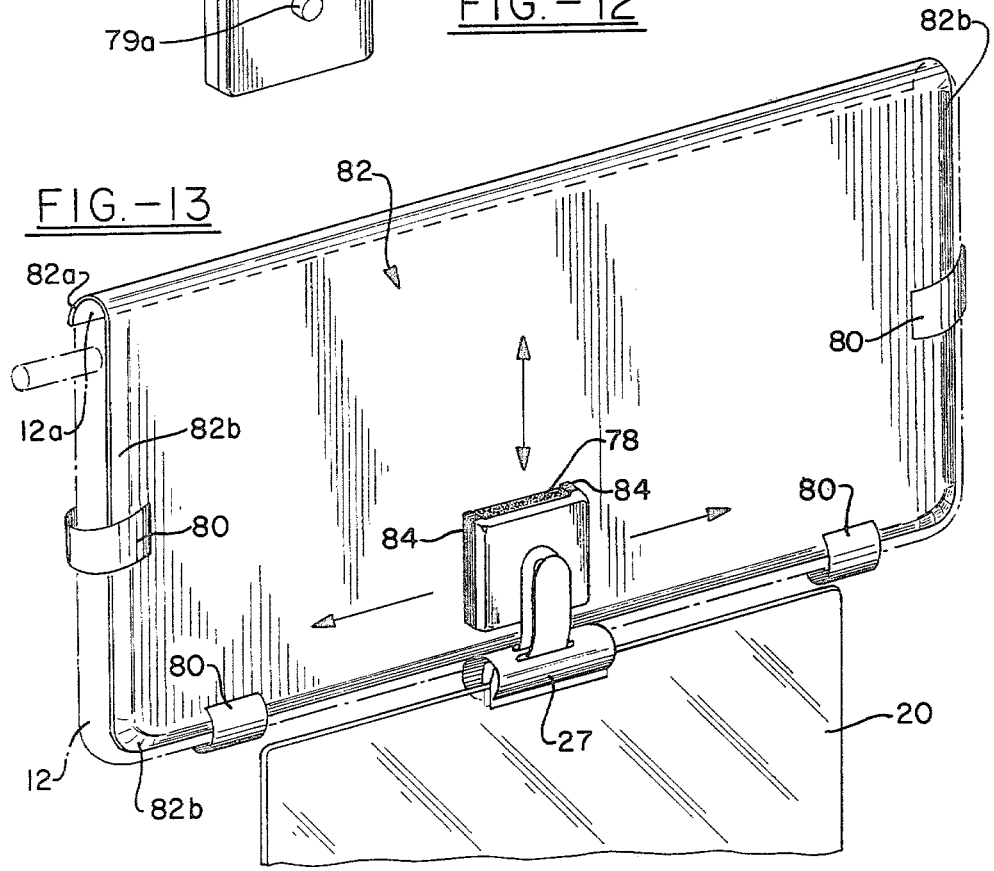
FIG. 13 is a perspective view illustrating still another embodiment of the clip in the form of a plate as it may be attached to a standard visor.

FIG. 13 illustrates an embodiment of the invention wherein the metal clip 22 is made such that its width substantially covers the entire surface of a standard visor 12. In this configuration a light guage metal plate 82 is formed with a hook portion 82a that conforms to the upper edge 12a of the standard visor 12 and at least two clamps 80 are provided that complete securing of the plate 82 to the visor 12. The clamps 80 also tend to restrict movement of the plate when a magnet 78 is attached thereto and moved so as to position the filter 20. The plate 82 is further characterized by peripheral edges 82b that are beveled inwardly toward the standard visor surface so that no edges of the plate are exposed. For example, many standard vehicle visors are made such that a seam is evident about the peripheral edge of the visor. In this circumstance the plate 82 will have its peripheral edges turned inwardly to match the seam of the standard visor and this results in a mounting of the plate 82 that is smooth to the touch and pleasing in appearance. When mounted on standard visors having no seam edges, the periphery of the plate 82 will conform to periphery of the standard visor. It will be appreciated that this configuration allows for unlimited movement of the filter element 20 about the visor 12 without repositioning of a clip as would be required in the previously described examples. Further, with respect to this embodiment, it is anticipated that the metal plate 82 may be crimped about its periphery so as to be semi-permanently affixed to the standard visor 12 and it may also be painted to match the interior decor of the vehicle and therefore will give an aesthetic appearance to the assembly. In this respect, and so as not to scratch or mar the painted surface, the magnet 78 is provided with a non-scratching edge covering 84 of nylon or the like.

While certain representative embodiments and details have been shown for the purpose of illustrating the invention, it will be apparent to those skilled in the art that various changes and modifications may be made thereto without departing from the spirit or scope of the invention.

What is claimed is:

1. An auxiliary visor for mounting on a standard opaque vehicle sun visor to filter out harmful sun and/or glare rays passing through the vehicle windshield comprising:
   a substantially flat elongated magnetizeable metal plate having one end bent to form a hook such that the plate may be clipped over an edge of the standard vehicle visor, the opposite end thereof presenting a flat surface on the standard visor and having plastic side rails affixed to opposite lateral edges for the length thereof and a plastic cross member affixed to the rails across the plate from one rail to the other at the end of the plate proximate the hooked end;
   a rectangularly shaped transparent plastic light filter; and
   a single magnet rigidly attached to a spring tensioned clip, said clip mounted to an edge of the plastic light filter and held in position thereon by the spring tensioned closure, said magnet being attached to the metal plate by its magnetic attraction and movable thereon between the plastic rails and along the lengthwise extent of the plate to any desired position and being in a stowed position on the standard visor by reason of its positioning under the cross member.

2. An auxiliary visor for mounting on a standard opaque vehicle sun visor to filter out harmful sun and/or glare rays passing through the vehicle windshield comprising:
   a substantially flat elongated plastic member having one end portion formed to a hook shape for mounting over an edge of the standard visor and exhibiting a closure force sufficient to securely hold the member to the standard visor, the remaining portion characterized by molded-in rails along opposite lateral edges for the length thereof and a substantially rectangular magnetizeable metal plate securely mounted between the rails and to the surface of the plastic member;
   a transparent plastic light filter; and
   a single magnet attached to a spring tensioned clip, said clip mounted by its spring tensioned closure to an edge of the filter and in any desired position and said magnet magnetically attached to the metal plate and movable thereon between the rails and along the lengthwise extent thereof.

3. The auxiliary visor as set forth in claim 2 wherein the metal plate is affixed to the plastic member by reason of having its longitudinal lateral edges inserted in slits provided in the inside facing edges of the rails at the juncture of the rail and the flat surface of the plastic member.

4. The auxiliary visor as set forth in claim 2 wherein a cross member is affixed to the rails from one to the other across the width of the plastic member proximate the hooked end to provide a stop for the magnet and a means for stowage of same under the cross member.

5. An auxiliary visor for mounting on a standard opaque vehicle sun visor to filter out harmful sun and/or glare rays passing through the vehicle windshield comprising:
   a substantially flat magnetizeable metal plate having a shape conforming to the shape of the standard vehicle visor and painted to match the interior decor of the vehicle, said plate having all its peripheral edges slightly crimped to present a smooth transition between the plate and the edges of the standard visor to which it is mounted, said plate mounted to the standard visor via a plurality of movable clamps mounted about the periphery of the visor;
   a transparent plastic light filter; and
   a single magnet mounted in a cup shaped housing affixed to a spring tensioned clip, said clip attached to the filter via its tensioned closure and said magnet magnetically attached to the metal plate and movable to any of a plurality of desired positions thereon.

6. The auxiliary visor as set forth in claim 5 wherein the cup-shaped housing has edges which are covered with a plastic material to present a scratch and mar resistant edge to the painted plate surface as it is moved about the surface thereof.

7. The auxiliary visor as set forth in claim 2 wherein the metal plate is adhesively secured to the plastic member.

8. The auxiliary visor as set forth in either of claims 1 or 4 further comprising a cord attached to the magnet and a roller mounted adjacent the cross member, said cord passing under the cross member and about the roller to facilitate moving the magnet and filter to a stowed position on the standard visor.

* * * * *